(12) United States Patent
Li et al.

(10) Patent No.: US 10,893,307 B2
(45) Date of Patent: Jan. 12, 2021

(54) VIDEO SUBTITLE DISPLAY METHOD AND APPARATUS

(71) Applicant: Alibaba Group Holding Limited, Grand Cayman (KY)

(72) Inventors: Min Li, Hangzhou (CN); Lei Zhang, Beijing (CN)

(73) Assignee: Alibaba Group Holding Limited, Grand Cayman (KY)

( * ) Notice: Subject to any disclaimer, the term of this patent is extended or adjusted under 35 U.S.C. 154(b) by 0 days.

(21) Appl. No.: 16/455,585

(22) Filed: Jun. 27, 2019

(65) Prior Publication Data
US 2020/0007902 A1  Jan. 2, 2020

(30) Foreign Application Priority Data
Jun. 29, 2018  (CN) .......................... 2018 1 0700366

(51) Int. Cl.
| | |
|---|---|
| *H04N 5/92* | (2006.01) |
| *H04N 9/82* | (2006.01) |
| *H04N 9/80* | (2006.01) |
| *H04N 21/235* | (2011.01) |
| *H04N 21/431* | (2011.01) |
| *H04N 21/435* | (2011.01) |
| *H04N 21/488* | (2011.01) |

(Continued)

(52) U.S. Cl.
CPC ......... *H04N 21/235* (2013.01); *H04N 21/435* (2013.01); *H04N 21/4312* (2013.01); *H04N 21/4884* (2013.01)

(58) Field of Classification Search
USPC ................ 386/245, 246, 247, 248, 239, 278
See application file for complete search history.

(56) References Cited

U.S. PATENT DOCUMENTS

| | | | |
|---|---|---|---|
| 8,330,863 | B2 | 12/2012 | Kondo et al. |
| 8,436,918 | B2 | 5/2013 | Claydon et al. |

(Continued)

FOREIGN PATENT DOCUMENTS

| | | |
|---|---|---|
| CN | 101594475 A | 12/2009 |
| CN | 102158666 A | 8/2011 |

(Continued)

OTHER PUBLICATIONS

The PCT Search Report and Written Opinion dated Oct. 1, 2019, for PCT Application No. PCT/US19/39616, 9 pages.

(Continued)

*Primary Examiner* — Daquan Zhao
(74) *Attorney, Agent, or Firm* — Lee & Hayes, P.C.

(57) ABSTRACT

The present disclosure relates to a video subtitle display method and apparatus. The method includes receiving a request to play a target video sent by a terminal; determining a display mode of a subtitle according to a content type corresponding to the subtitle of the target video; and controlling the terminal to display the subtitle on a video picture according to the display mode when the target video is played. The video subtitle display method and apparatus provided by the embodiments of the present disclosure enable the display mode of the subtitle of the video to be changed according to the content type corresponding to the subtitle, and therefore, satisfying the user's viewing requirements for subtitles of different content types.

17 Claims, 8 Drawing Sheets

(51) Int. Cl.
 *G11B 27/00* (2006.01)
 *H04N 5/93* (2006.01)

(56) References Cited

U.S. PATENT DOCUMENTS

| | | | |
|---|---|---|---|
| 8,594,204 B2 | 11/2013 | De Haan | |
| 8,677,436 B2 | 3/2014 | Nagasawa et al. | |
| 9,025,933 B2 | 5/2015 | Hattori et al. | |
| 9,443,495 B2 | 9/2016 | Newton et al. | |
| 9,578,304 B2 | 2/2017 | Suh et al. | |
| 9,602,757 B2 | 3/2017 | Chaudhri | |
| 2007/0092228 A1 | 4/2007 | Ando et al. | |
| 2009/0060452 A1* | 3/2009 | Chaudhri | H04N 5/445 386/239 |
| 2009/0073314 A1 | 3/2009 | Uemukai et al. | |
| 2009/0324202 A1 | 12/2009 | Okubo et al. | |
| 2010/0260477 A1 | 10/2010 | Zhang et al. | |
| 2011/0033169 A1 | 2/2011 | Ando et al. | |
| 2011/0292175 A1 | 12/2011 | Suh et al. | |
| 2012/0137216 A1* | 5/2012 | Choi | G06F 3/04883 715/255 |
| 2012/0315022 A1 | 12/2012 | Nagasawa et al. | |
| 2014/0201631 A1 | 7/2014 | Pornprasitsakul et al. | |
| 2016/0014482 A1 | 1/2016 | Chen et al. | |

FOREIGN PATENT DOCUMENTS

| | | |
|---|---|---|
| CN | 104105002 A | 10/2014 |
| CN | 104581341 A | 4/2015 |
| CN | 105025378 A | 11/2015 |
| CN | 107193836 A | 9/2017 |
| CN | 108055592 A | 5/2018 |
| JP | 2009088634 A | 4/2009 |

OTHER PUBLICATIONS

First Office Action dated Jun. 29, 2020 by the China Patent Office in corresponding Application No. CN 201810700366, 8 pages.
English-language translation of First Office Action dated Jun. 29, 2020 by the China Patent Office in corresponding Application No. CN 201810700366, 11 pages.
First Search Report dated Jun. 17, 2020 by the China Patent Office in corresponding Application No. CN 201810700366, 2 pages.

* cited by examiner

VIDEO SUBTITLE DISPLAY METHOD AND APPARATUS

CROSS REFERENCE TO RELATED PATENT APPLICATIONS

The application claims priority to Chinese Patent Application No. 201810700366.8, filed on Jun. 29, 2018, entitled "Video Subtitle Display Method and Apparatus," which is hereby incorporated by reference in its entirety.

TECHNICAL FIELD

The present disclosure relates to the technical field of computers, and particularly, to video subtitle display methods and apparatuses.

BACKGROUND

With the continuous advancement of technology, users can watch favorite videos through terminals such as mobile phones and combine the subtitles to understand the specific content of the videos. However, in conventional techniques, the display mode of the subtitles is fixed and simple during the video playback, which cannot satisfy the requirements of the users to view different subtitles on the video pictures during the video playback.

SUMMARY

This Summary is provided to introduce a selection of concepts in a simplified form that are further described below in the Detailed Description. This Summary is not intended to identify all key features or essential features of the claimed subject matter, nor is it intended to be used alone as an aid in determining the scope of the claimed subject matter. The term "techniques," for instance, may refer to device(s), system(s), method(s) and/or processor-readable/computer-readable instructions as permitted by the context above and throughout the present disclosure.

In view of the foregoing, the present disclosure proposes a video subtitle display method and device.

According to an aspect of the present disclosure, a video subtitle display method implemented on a server is provided. The method includes receiving a request to play a target video sent by a terminal; determining a display mode of a subtitle of the target video according to a content type corresponding to the subtitle; and controlling the terminal to display the subtitle on a video picture of the target video according to the display mode when the target video is played.

In embodiments, the method further includes determining one or more subtitle segments of the subtitle according to at least one of subtitle content of the subtitle, video frame, and audio content of the target video; and determining content types corresponding to the one or more subtitle segments of the subtitle, respectively.

In embodiments, determining content types corresponding to the one or more subtitle segments of the subtitle, respectively, further includes inputting a target subtitle segment into a classification model for processing, and obtaining a content type corresponding to the target subtitle segment, the target subtitle segment being one of the one or more subtitle segments, where the classification model is trained according to reference subtitle segments and calibration content types of the reference subtitle segments.

In embodiments, the method further includes determining key information from an initial subtitle of the target video; determining an expanded subtitle of the key information; and determining the subtitle of the target video according to the initial subtitle and the expanded subtitle.

In embodiments, the display mode of the subtitle includes a plurality of display modes corresponding to a content type of the subtitle. Further, the controlling the terminal to display the subtitle on the video picture of the target video according to the display mode when the target video is played includes providing, to the terminal, the plurality of display modes to be selected for the content type; receiving, from the terminal, a selected display mode; controlling the terminal to display the subtitle corresponding to the content type on the video picture of the target video according to the selected display mode when the target video is played.

In embodiments, the content type includes at least one of dialogue, narration, poetry, lyrics, or annotation.

In embodiments, the display mode includes at least one of a display time, a display position, a display font, a display color, a display size, a layout manner, a display background, or a degree of transparency of the display background of the subtitle of the target video on the video picture.

According to another aspect of the present disclosure, a video subtitle display apparatus implemented on a server is provided. The apparatus includes a request receiving module configured to receive a request to play a target video sent by a terminal; a mode determining module configured to determine a display mode of a subtitle of the target video according to a content type corresponding to the subtitle; and a play control module configured to display, during the play of the target video, the subtitle on a video picture of the target video according to the display mode.

In embodiments, the apparatus further includes a segment determining module configured to determine one or more subtitle segments of the subtitle according to at least one of subtitle content of the subtitle, video frame, or audio content of the target video; and a type determining module configured to determine a content type corresponding to the one or more subtitle segments, respectively.

In embodiments, the type determining module includes a determining sub-module configured to input a target subtitle segment into a classification model for processing and obtain a content type corresponding to the target subtitle segment, the target subtitle segment being one of the one or more subtitle segments, where the classification model is trained according to reference subtitle segments and calibration content types of the reference subtitle segments.

In embodiments, the apparatus further includes an information determining module configured to determine key information from an initial subtitle of the target video; a subtitle expansion module that determines an expanded subtitle according to the key information; and a subtitle determining module configured to determine the subtitle of the target video according to the initial subtitle and the expanded subtitle.

In embodiments, the display mode of the subtitle includes a plurality of display modes corresponding to a content type of the subtitle. Further, the play control module includes a mode transmitting sub-module configured to provide the terminal with the plurality of display modes to be selected for the content type; a mode receiving sub-module configured to receive a selected display mode from the terminal; and a play control sub-module configured to display, during the play of the target video, the subtitle corresponding to the content type on the video picture of the target video according to the selected display mode.

In embodiments, the content type includes at least one of dialogue, narration, poetry, lyrics, or annotation.

In embodiments, the display mode includes at least one of a display time, a display position, a display font, a display color, the display size, a layout manner, a display background, or a degree of transparency of the display background of the subtitle of the target video on the video picture.

According to another aspect of the present disclosure, a video subtitle display apparatus is provided. The apparatus includes a processor and a memory for storing processor-executable instructions, where the processor is configured to implement the video subtitle display method described above.

According to another aspect of the present disclosure, a non-transitory computer readable storage media having computer program instructions stored thereon is provided. The computer program instructions are executed by a processor to implement the video subtitle display method.

According to the video subtitle display methods and apparatuses provided by the embodiments of the present disclosure, a request to play a target video sent by a terminal is received; a display mode of a subtitle of the target video according to a content type corresponding to the subtitle is determined; and the terminal is controlled to play the target video, during which, the subtitle is displayed on a video picture of the target video according to the display mode. Display modes of subtitles of a video can be changed according to different content types corresponding to the subtitles, and therefore, satisfying the requirements of the user to view the subtitles corresponding to different content types.

Further features and aspects of the present disclosure will become apparent from the following detailed description of exemplary embodiments.

BRIEF DESCRIPTION OF THE DRAWINGS

Drawings incorporated in the specification and forming part of the specification, in conjunction with the specification, illustrate exemplary embodiments, features, and aspects of the present disclosure, and are used to explain the principles of the disclosure.

DETAILED DESCRIPTION

Various exemplary embodiments, features, and aspects of the present disclosure are described in detail below with reference to the drawings. The same reference numerals in the drawings denote the same or similar elements. Although various aspects of the embodiments are illustrated in the drawings, the drawings are not necessarily drawn to scale unless otherwise indicated.

The word "exemplary" is used herein to mean "serving as an example, an embodiment, or illustrative." Any embodiment described herein as "exemplary" is not necessarily to be construed as preferred or better than other embodiments.

In addition, numerous specific details are set forth in the detailed description herein below. It should be appreciated by those skilled in the art that the present disclosure may be implemented without certain specific details. In some embodiments, methods, means, components, and circuits that are well known to those skilled in the art are not described in detail.

Figure 1:
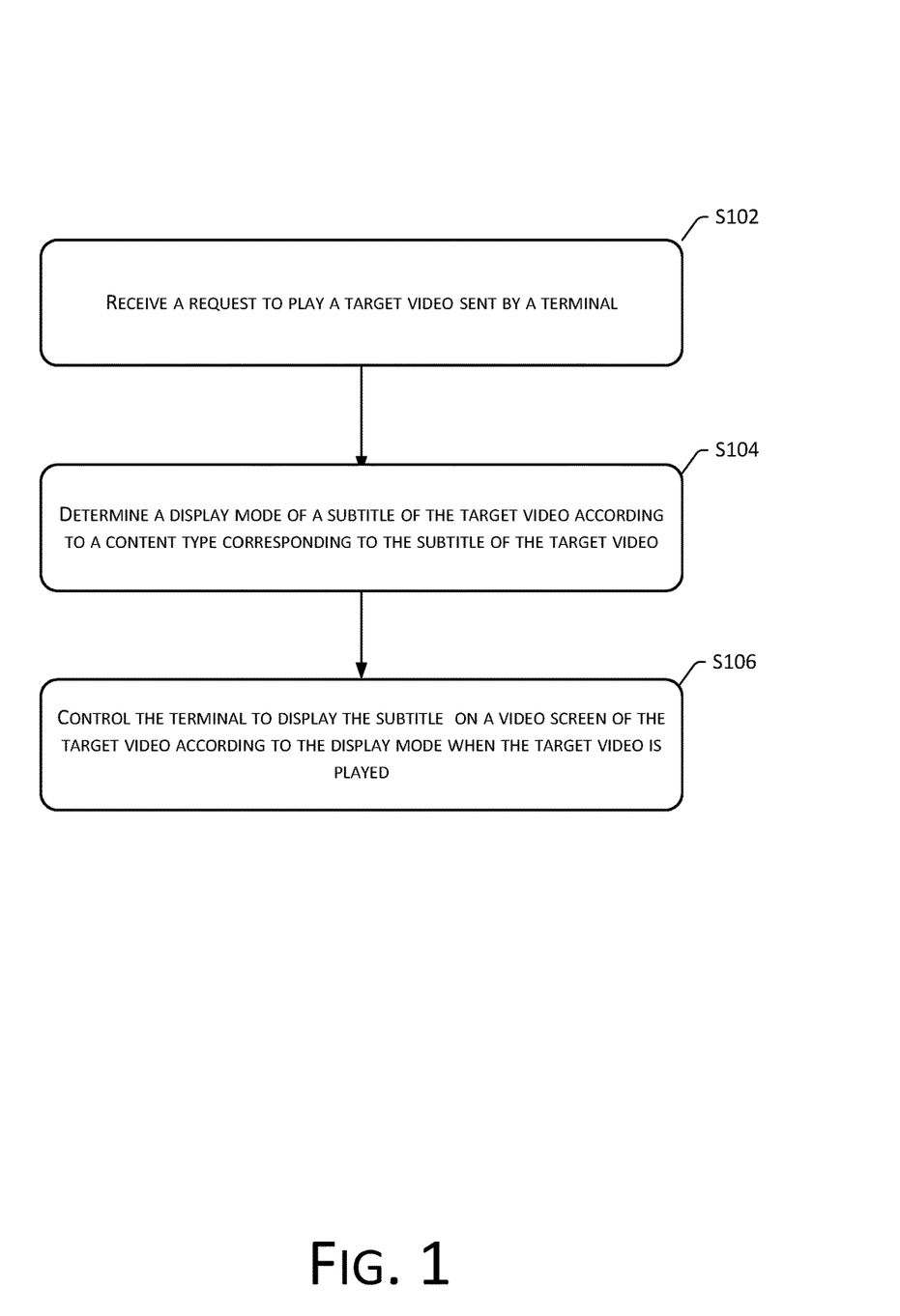
FIG. 1 illustrates a flowchart of a video subtitle display method according to an embodiment of the present disclosure.

FIG. 1 illustrates a flowchart of a video subtitle display method according to an embodiment of the present disclosure. As shown in FIG. 1, the method may be implemented on a server. The method includes steps S102, S104 and S106.

In step S102, a request to play a target video sent by a terminal is received.

According to the present embodiment, the target video may be a movie, TV series, a TV show, etc., that can be viewed by a user. The request may be generated by the terminal according to the target video selected by the user upon detecting the user's operation on the selected target video. The server may further determine a display mode of a subtitle in response to the request to play the target video. The terminal may be a terminal capable of playing videos, such as a mobile phone, a tablet computer, a computer, etc. It should be understood for those of ordinary skilled in the art that the above examples for the terminal are merely for illustration purpose and the present disclosure is not intended to be limiting.

In step S104, a display mode of a subtitle is determined according to a content type corresponding to the subtitle of the target video.

According to the present embodiment, the content type may refer to the type that the subtitle belongs to and is determined according to the actual content of the subtitle. The content type of the subtitle corresponding to the target video may include one or more content types. The display mode of the subtitle may refer to the display state of the subtitle of the target video on the video picture during the play of the target video. The server may predetermine whether the content type corresponding to the subtitle of the target video is saved on the server. If the content type corresponding to the subtitle of the target video is saved, the server may determine the display mode directly from the saved content type corresponding to the subtitle of the target video. If the content type corresponding to the subtitle of the target video is not saved, the server may determine the content type corresponding to the subtitle of the target video, and further determine the display mode.

According to the present embodiment, step S104 may also be performed before step S102, that is, the server may determine the display mode of the subtitle according to the content type corresponding to the subtitle of the target video before receiving the request to play the target video. Further, the server may respond to the request to play the target video and determine the display mode of the subtitle according to the content type corresponding to the subtitle of the target video in real time. It should be understood for those of ordinary skills in the art that the above examples are for illustration purpose and the present disclosure is not intended to be limiting.

According to the present embodiment, one or more corresponding display modes may be determined based on the content type of the subtitle of the target video. For example, for a content type A of a subtitle, determined display modes of the subtitle may include a display mode 1 and a display mode 2. When a corresponding single display mode is determined according to the content type of the subtitle, the terminal may be directly controlled to display the subtitle on the video picture of the target video according to the display mode during the play of the target video. When a plurality of display modes are determined according to the content type of the subtitle, a selected display mode may be determined according to the selection feedback of the user received from terminal. Further, the terminal is controlled to display the subtitle on the video picture of the target video according to the selected display mode during the play of the target video.

In some embodiments, the content type may include one or any combinations of dialogue, narration, poetry, lyrics, and annotation.

When the subtitle displayed on the video picture is a dialogue between different characters in the target video, it may be determined that the content type corresponding to the subtitle is a dialogue. When the subtitle displayed on the video picture is a synopsis of the target video, plot scene introduction, character inner activities, it may be determined that the content type corresponding to the subtitle is narration. When the subtitle displayed on the video picture is a poetry recited by the character in the target video (poetry herein may refer to an ancient Chinese traditional poetry represented by an ancient poetry, a contemporary poetry, rhyme words, or a modern poetry, etc.), it may be determined that the content type corresponding to the subtitle is a poetry. When the subtitle displayed on the video picture is the lyrics of a song sung by the character in the target video, such as episodes, the title song, the ending song of the target video, or the like, it may be determined that the content type corresponding to the subtitle is lyrics. When the subtitle displayed on the video picture is an introduction, an explanation, a comment, a translation, or the like, of the words spoken by the character in the target video, it may be determined that the content type corresponding to the subtitle is an annotation. The content type may also correspond to other scripts having a special meaning in the subtitle. It should be understood for those of ordinary skilled in the art that the content type may be set according to actual needs and the present disclosure is not intended to be limiting.

In embodiments, the display mode may include at least one of the display time, the display position, the display font, the display color, the display size, the layout manner, the display background, or the transparency of the display background of the subtitle on the video picture of the target video.

The display time of the subtitle may include a start time and an end time of the subtitle being displayed on the video picture of the target video. The display position of the subtitle may include any position on the video picture such as an upper side, a lower side, a left side, or a right side of the video picture. The display font of the subtitle may include any font such as Chinese Song font or Chinese Kai font. The display color of the subtitle may include a monochrome color such as black or white, or a polychromatic color including a plurality of colors. The multiple words of the subtitle may be displayed in a same color or different colors. The display size of the subtitle may include any font size such as font size 4 or font size 3. The subtitle may be arranged in a horizontal layout (i.e., the text in the subtitle may be read from left to right or from right to left) or a vertical layout (i.e., the text in the subtitle may be read from top to bottom or from bottom to top). The display background of the subtitle may include a solid background, for example, a white solid background, or a black solid background. Alternatively, the display background of the subtitle may include a patterned background with a specific color, for example, a cloud patterned background in blue color. The degree of transparency of the display background may be any number such as 100%, 50%, etc. The lower the degree of transparency of the display background, the clearer the text in the subtitle viewed by the user. The higher the degree of transparency of the display background, the less the occlusion of the subtitle on the video picture, leading to better viewing effect on the video picture.

According to the present embodiment, the display mode of the subtitle may be set according to the content type corresponding to the subtitle. For example, for a subtitle corresponding to a content type being poetry, the arrangement of the subtitle may be set in the display mode to be a vertical layout. For a subtitle corresponding to a content type being annotation, the display size may be set in the display mode to be smaller than other subtitles. For example, the display size of the annotation is set as font size small five, and the display size of other subtitles is set as font size four. It should be understood for those of ordinary skilled in the art that the display modes of the subtitles corresponding to different content types may be set according to actual needs and the present disclosure is not intended to be limiting.

In step S106, the terminal is controlled to display the subtitle on a video picture of the target video according to the display mode when the target video is played.

Figure 2:
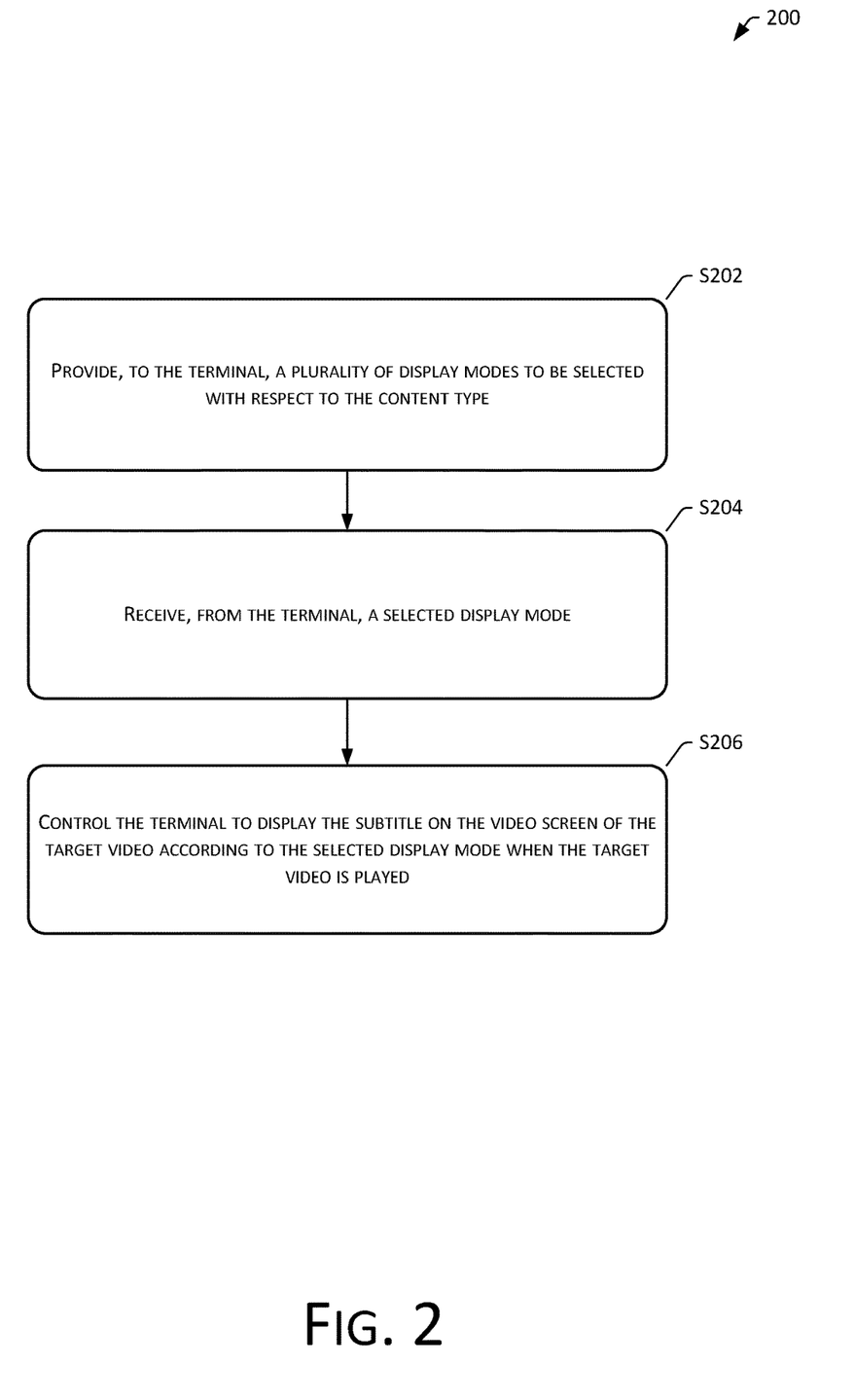
FIG. 2 illustrates a flowchart of step S106 in a video subtitle display method according to an embodiment of the present disclosure.

FIG. 2 illustrates a flowchart of step S106 in a video subtitle display method according to an embodiment of the present disclosure. In some embodiments, as shown in FIG. 2, the display mode of the subtitle may include multiple display modes corresponding to the content type of the subtitle, and step S106 may include steps S202, S204 and S206.

In step S202, the terminal is provided with a plurality of display modes to be selected for the content type.

According to the present embodiment, the terminal may be controlled to display a plurality of display modes to the user upon receiving the plurality of display modes to be selected for the type of content. The terminal may be further controlled to determine a selected display mode from the plurality of display modes according to a user's selection.

For example, the terminal may be controlled to display a selection list of a plurality of display modes on the display interface. Upon detecting a trigger operation on the plurality of display modes in the selection list, such as a click, a double-click, or the like, the terminal may determine a selected display mode according to the trigger operation. The selected display mode may be further sent to the server.

In step S204, the selected display mode from the terminal is received.

According to the present embodiment, the selected display mode received by the server may be information related to the selected display mode, such as a name, a number, etc., that corresponds to the selected display mode.

In step S206, the terminal is controlled to display the subtitle on the video picture of the target video according to the selected display mode when the target video is played.

According to the present implementation, when the display mode of the subtitle may include multiple display modes corresponding to the content type of the subtitle, the subtitle of the target video is displayed according to the user's selection, and therefore, the personalized requirement of the user is satisfied.

Figure 3:
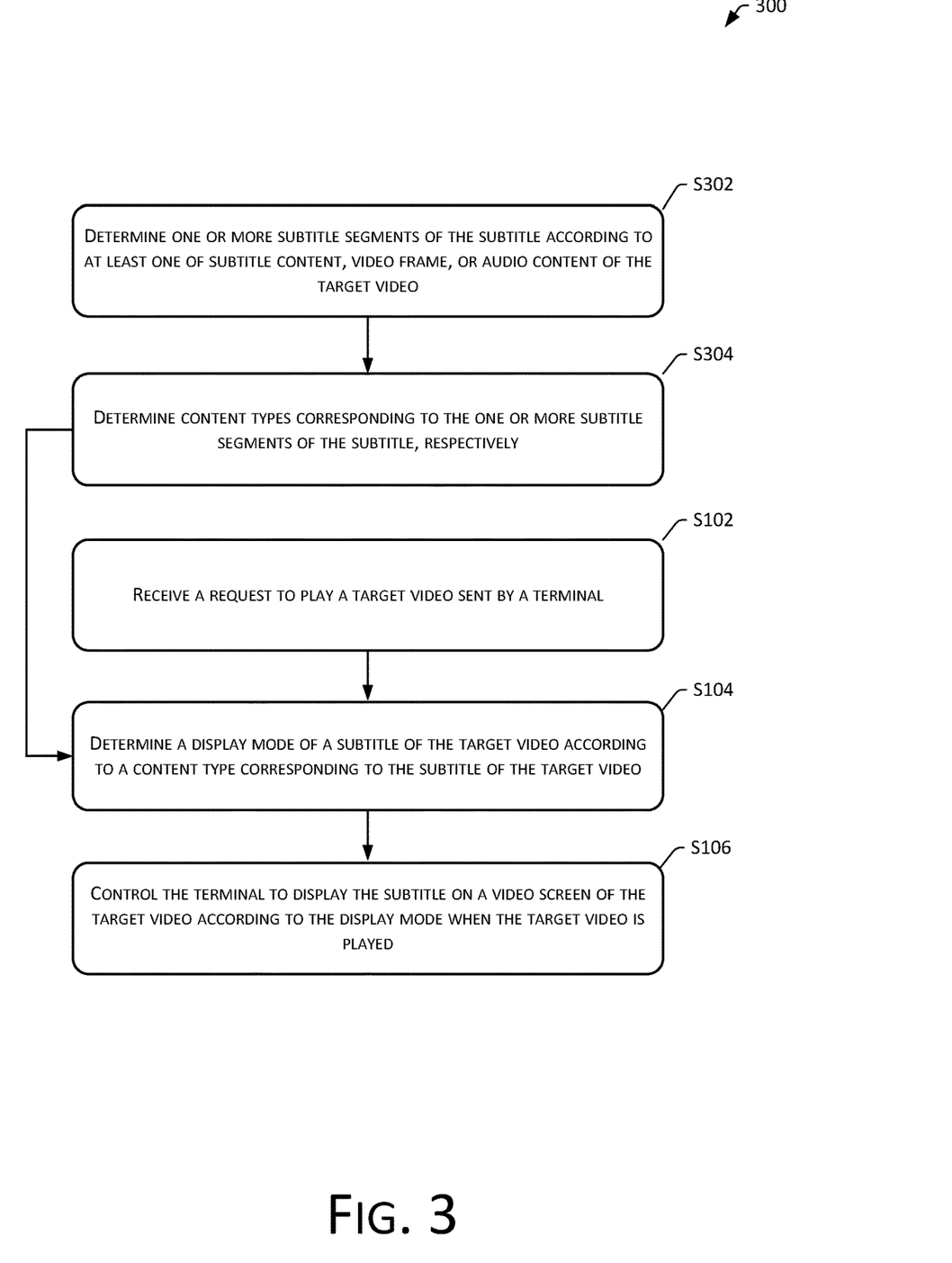
FIG. 3 illustrates a flowchart of a video subtitle display method according to an embodiment of the present disclosure.

FIG. 3 illustrates a flowchart of a video subtitle display method according to an embodiment of the present disclosure. In some embodiments, as shown in FIG. 3, the method may further comprise step S302 and step S304.

In step S302, one or more subtitle segments of the subtitle are determined according to at least one of the subtitle content of the target video, the video frame, or the audio content of the target video.

According to the present embodiment, information related to the segmentations of the subtitle may be determined according to at least one of the subtitle content, the video frame, or the audio content of the target video, for example, whether the subtitle is a complete sentence, whether the subtitle corresponds to a same video scene, etc. One or more subtitle segments may be further determined according to the information related to the segmentations of the subtitle. For example, a plurality of complete sentences are determined according to the subtitle content of the target video and are further used to determine a plurality of subtitle segments. Further, a plurality of video scenes are determined according to the video frames of the target video and are further used to determine a plurality of subtitle segments. It should be understood to those of ordinary skilled in the art that the manner of determining the subtitle segments may be set according to actual needs and the present disclosure is not intended to be limiting.

In step S304, content types corresponding to one or more subtitle segments are determined, respectively.

According to the present embodiment, the corresponding content type may be determined according to the characteristics of the subtitle segment. For example, the content type corresponding to the subtitle segment is determined according to the subtitle text content corresponding to the subtitle segment, whether the corresponding audio is music, whether subtitle text content includes a keyword corresponding to the content type, or the like.

Figure 4:
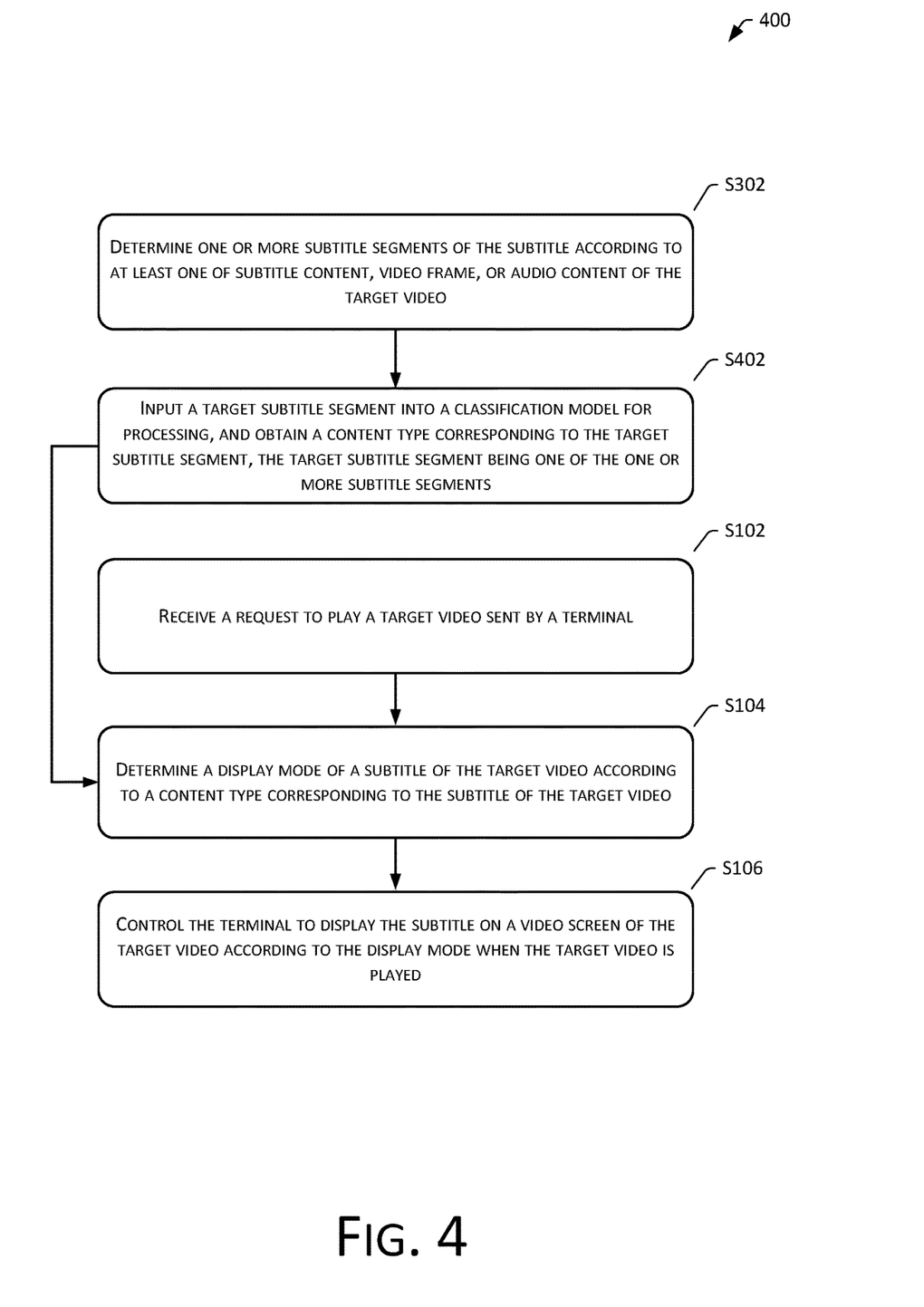
FIG. 4 illustrates a flowchart of a video subtitle display method according to an embodiment of the present disclosure.

FIG. 4 illustrates a flowchart of a video subtitle display method according to an embodiment of the present disclosure. In some embodiments, as shown in FIG. 4, step S304 may include step S402.

In step S402, the target subtitle segment is input into the classification model for processing, and the content type corresponding to the target subtitle segment is obtained. The target subtitle segment may be any one of the one or more subtitle segments. The classification model is trained according to the reference subtitle segments and the calibration content types of the reference subtitle segments.

According to the present embodiment, the server may separately input one or more subtitle segments of the target video into the classification model for processing to obtain a content type corresponding to each subtitle segment.

According to the present embodiment, the server may pre-train the model according to the reference subtitle segments and the calibration content types of the reference subtitle segments to obtain the classification model. For example, a large number of reference subtitle segments may be collected, and the content types corresponding to the reference subtitle segments may be determined by manual recognition. The classification model is further obtained according to the reference subtitle segments and the calibration content types of the reference subtitle segments. In another embodiment, a plurality of reference subtitle segments with determined content types may be obtained directly, and a classification model may be trained according to the reference subtitle segments and the calibration content types of the reference subtitle segments.

According to the present embodiment, the reference subtitle segments and the calibration content types of the reference subtitle segments may be trained by using Machine Learning (ML), deep learning, etc., to obtain a desired classification model. It should be understood for those of ordinary skilled in the art that the way the classification model is obtained may be set according to actual needs and the present disclosure is not intended to be limiting.

Figure 5:
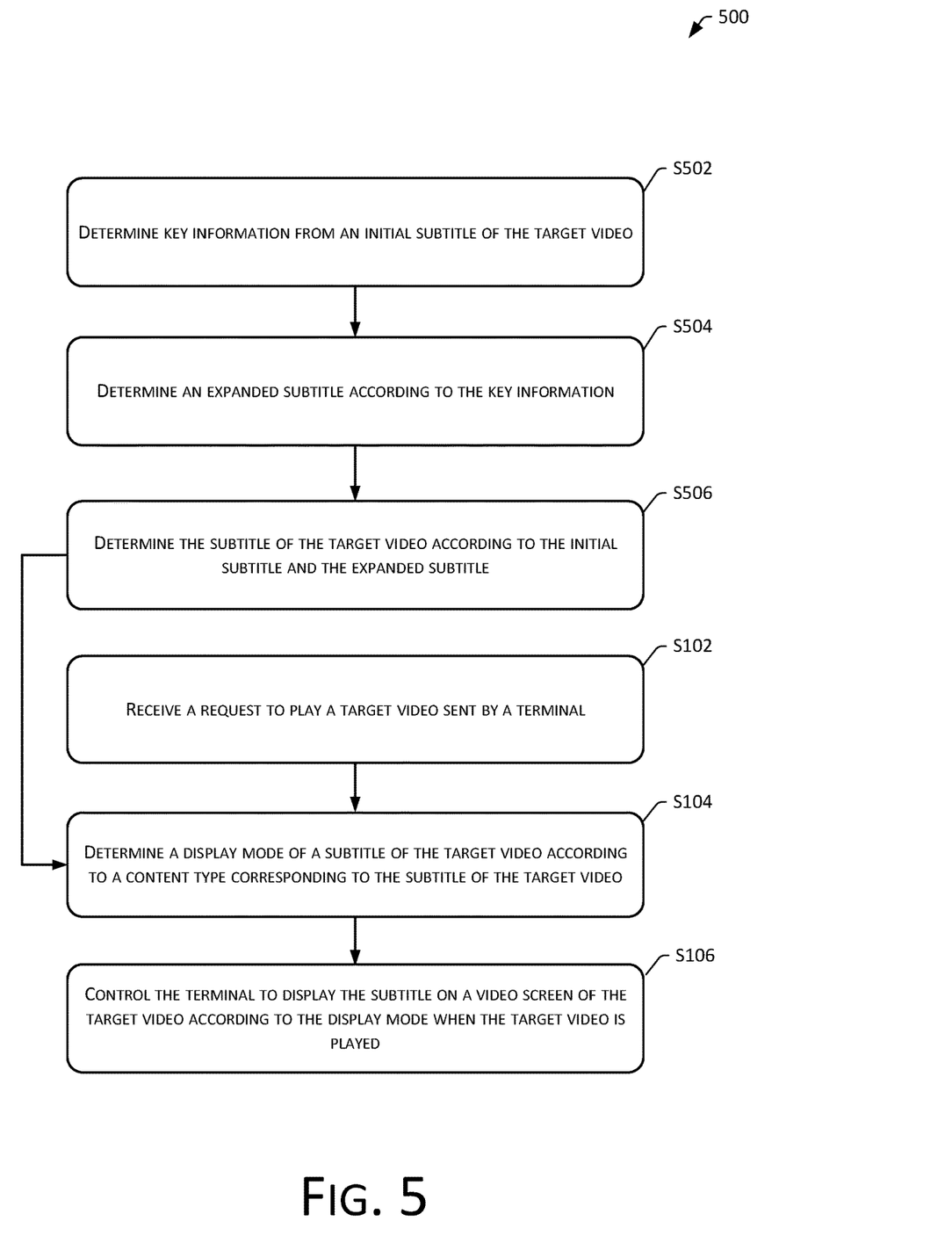
FIG. 5 illustrates a flowchart of a video subtitle display method according to an embodiment of the present disclosure.

FIG. 5 illustrates a flowchart of a video subtitle display method according to an embodiment of the present disclosure. In some embodiments, as shown in FIG. 5, the method may further include steps S502, S504 and S506.

In step S502, key information is determined from an initial subtitle of the target video.

According to the present embodiment, the key information may include a word or a sentence having a specified meaning in the subtitle. The key information may include words or sentences that refer to specific events, such as 2008 Olympics, Watergate event, etc. The key information may further include a name of a song, a title of a poetry, titles of TV series, a title of a movie, a name of a person (for example, a name of a celebrity), proverbs, quotations, or the like. The key information may further include a keyword or a key statement that characterizes the plot of the target video. It should be understood to those of ordinary skilled in the art that the key information may be set according to actual needs and the present disclosure is not intended to be limiting.

In step S504, an expanded subtitle is determined according to the key information.

According to the present embodiment, the expanded subtitle of the key information may be generated according to the information related to the key information such as, the interpretation of the acquired key information, the introduction of the key information, the expanded content related to the key information. For example, if the key information is event A, the expanded subtitle may be related introduction information of event A. In another example, if the key information is celebrity B, the expanded subtitle may include celebrity B's biography, productions and other information related to celebrity B. In yet another example, if the key information is proverb C, the expanded subtitle may be an interpretation of proverb C. In yet another example, if the key information is a keyword of the plot, the expanded subtitle may be a synopsis of the target video generated according to the keyword. It should be understood for those of ordinary skilled in the art that the expanded subtitles of the key information may be set according to actual needs and the present disclosure is not intended to be limiting.

In step S506, the subtitle of the target video is determined according to the initial subtitle and the expanded subtitle.

According to the present embodiment, the subtitles of the target video may be obtained by expanding the initial subtitles to the expanded subtitles. In this way, the users may combine expanded subtitles to understand the implication of the key information, lessen the difficulties to understand the implication of the key information, thus facilitating the users to understand the plot and the specific content of the target video.

For example, during the play of the video, key information such as events and celebrity names are displayed in the subtitles of the video. Due to the differences among the users, some users may not understand the specific meaning of the key information. The server may pre-acquire key information in the initial subtitle, determine the expanded subtitle of the key information, and generate a new subtitle of the video to display during the play according to the initial subtitle and the expanded subtitle, so that the users can understand the key information via viewing the new subtitle.

The target video may be a video originated and uploaded by a user that lacks a synopsis. Taking an original video as an example, because the original video has limited synopsis, it is difficult for users to determine the specific content of the original video before viewing it. The server may analyze the initial subtitles of the original video to extract key information related to the plot of the original video, such as keywords. A synopsis of the original video is generated according to the extracted keywords, and the expanded subtitles are further generated according to the synopsis. The synopsis may be displayed on the video picture at the beginning of playing the video for the users to understand the story of the original video. The user may further determine whether he or she is interested in the original video, and whether he or she wants to continue watching the original video.

It should be understood for those of ordinary skilled in the art that the video subtitle display methods described above are merely for illustration purpose and the present disclosure is not intended to be limiting. The steps of the methods may be adjusted flexibly according to personal preference and/or actual application scenarios to meet the technical solutions of the present disclosure.

According to the video subtitle display methods provided by the embodiments of the present disclosure, a request to play a target video sent by a terminal is received; a display mode of a subtitle according to a content type corresponding to the subtitle of the target video is determined; and the terminal, during the play of the target video, is controlled to display the subtitle on a video picture according to the display mode. The video subtitle display method enables the display mode of the subtitle of the video to be changed according to the content type corresponding to the subtitle, and therefore, satisfies the user's viewing requirements for subtitles of different content types.

Implementation Examples

Hereinafter, an implementation example according to an embodiment of the present disclosure will be given to understand the flow of the video subtitle display method, taking "a user watching a television show through a mobile phone" as an exemplary implementation scenario. It should be understood for those of ordinary skilled in the art that the following implementation examples are merely for illustration purpose and the present disclosure is not intended to be limiting.

User A watches his favorite TV series (i.e., the target video) through the mobile phone, and the mobile phone can generate a play request according to the TV series selected by user A.

The server determines the display mode of the subtitle according to the content type corresponding to the subtitle of the TV series and controls the terminal to display the subtitles of the TV series on the video picture of the TV series according to the display mode during the play of the TV series, where the content type corresponding to the subtitle of the TV series is pre-determined by the server. The details of determination process can be referred to the descriptions related to step S302.

According to this implementation, during the play of the TV series, the display mode of the subtitle is determined according to the content type corresponding to the subtitle of the TV series. Further, the subtitle is displayed on the video picture of the TV series according to the display mode, thus satisfying the viewing requirements of users to different content types.

Figure 6:
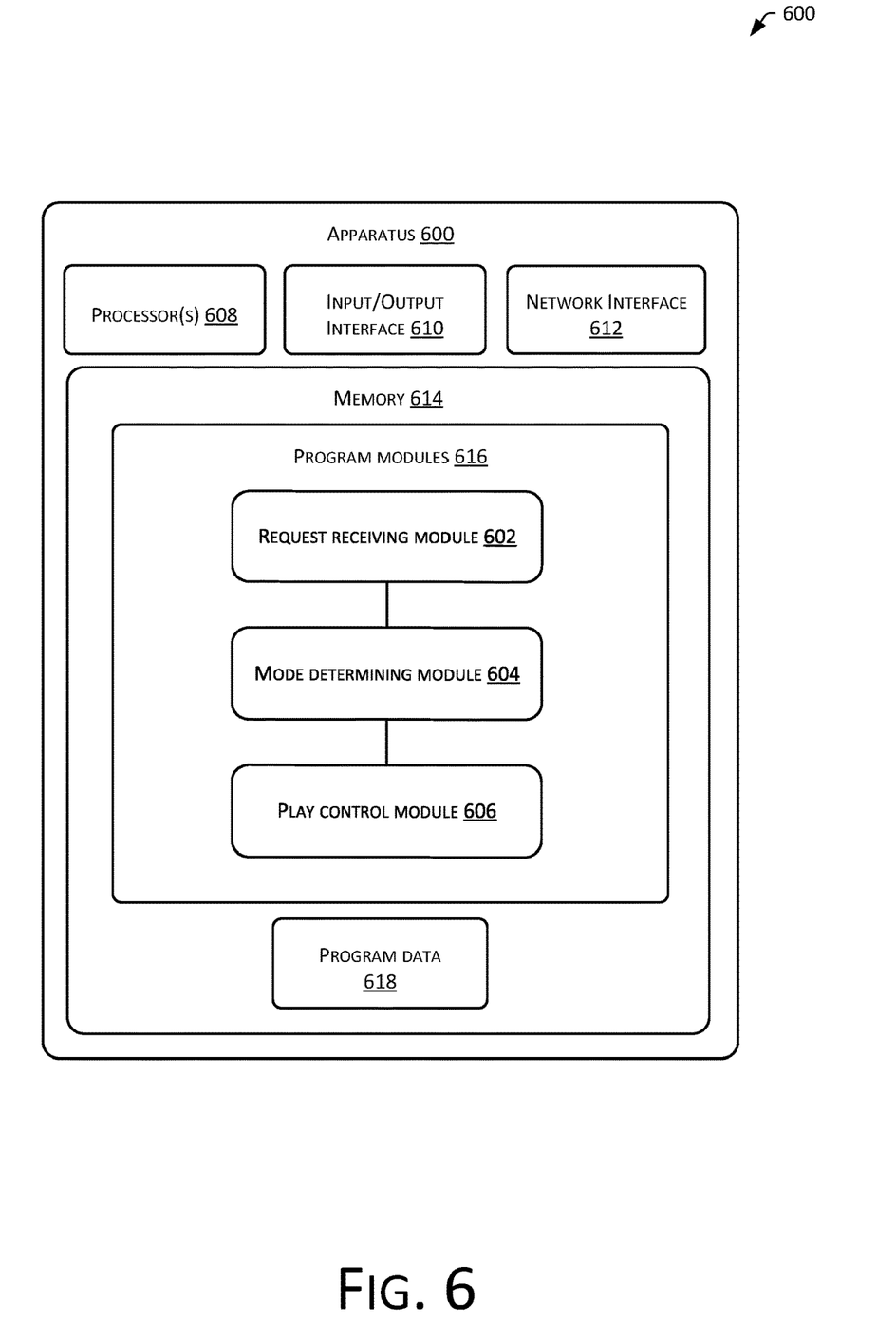
FIG. 6 illustrates a schematic diagram of a video subtitle display apparatus in accordance with an embodiment of the present disclosure.

FIG. 6 illustrates a schematic diagram of a video subtitle display apparatus 600 in accordance with an embodiment of the present disclosure. As shown in FIG. 6, the apparatus 600 may be implemented on a server. The apparatus may include a request receiving module 602, a mode determining module 604, and a play control module 606. The request receiving module 602 is configured to receive a request to play the target video sent by a terminal. The mode determining module 604 is configured to determine a display mode of a subtitle according to a content type corresponding to the subtitle of the target video. The play control module 606 is configured to control the terminal to display the subtitle on a video picture of the target video according to the display mode during a playback of the target video.

In embodiments, the apparatus 600 may further include one or more processors 608, an input/output (I/O) interface 610, a network interface 612, and memory 614.

The memory 614 may include a form of computer readable media such as a volatile memory, a random access memory (RAM) and/or a non-volatile memory, for example, a read-only memory (ROM) or a flash RAM. The memory 614 is an example of a computer readable media.

The computer readable media may include a volatile or non-volatile type, a removable or non-removable media, which may achieve storage of information using any method or technology. The information may include a computer-readable instruction, a data structure, a program module or other data. Examples of computer storage media include, but not limited to, phase-change memory (PRAM), static random access memory (SRAM), dynamic random access memory (DRAM), other types of random-access memory (RAM), read-only memory (ROM), electronically erasable programmable read-only memory (EEPROM), quick flash memory or other internal storage technology, compact disk read-only memory (CD-ROM), digital versatile disc (DVD) or other optical storage, magnetic cassette tape, magnetic disk storage or other magnetic storage devices, or any other non-transmission media, which may be used to store information that may be accessed by a computing device. As defined herein, the computer readable media does not include transitory media, such as modulated data signals and carrier waves.

In some embodiments, the memory 614 may include program modules 616 and program data 618. The program modules 616 may include one or more of the modules as described in the foregoing description and shown in FIG. 6.

Detailed description of content such as functions and technical effects of various functional modules involved in the video subtitle display apparatus of the present embodiment have been fully described in the foregoing embodiments, and the content thereof is still applicable to the present embodiment. Details thereof are not repeatedly described herein.

Figure 7:
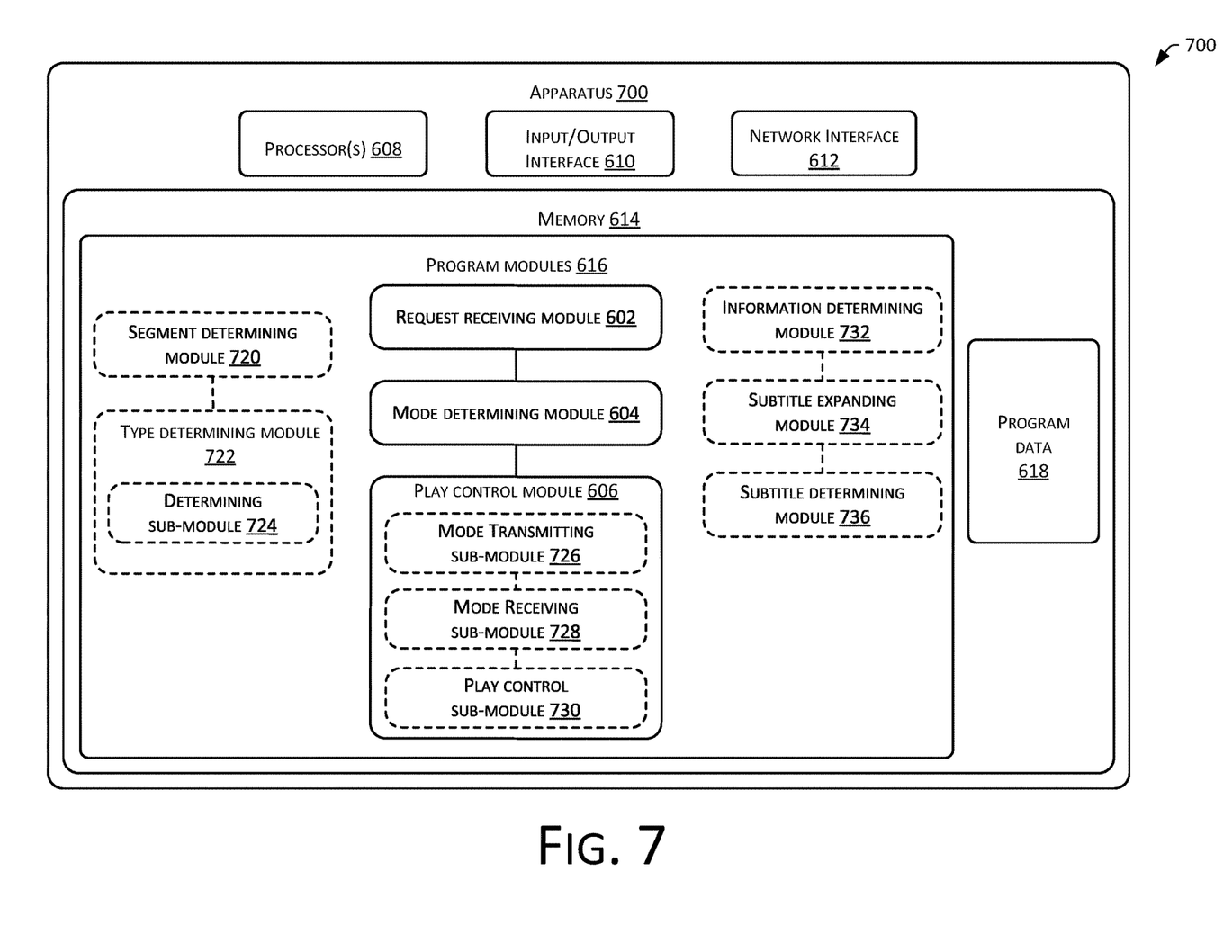
FIG. 7 illustrates a schematic diagram of a video subtitle display apparatus in accordance with an embodiment of the present disclosure.

FIG. 7 illustrates a schematic diagram of a video subtitle display apparatus in accordance with an embodiment of the present disclosure.

In embodiments, the memory 614 may include program modules 616 and program data 618. The program modules 616 may include one or more of the modules as described in the foregoing description and shown in FIG. 6. In embodiments, the program modules 616 may include one or more of the modules as described in the description herein and shown in FIG. 7.

In embodiments, as shown in FIG. 7, the apparatus may further include a segment determining module 720 and a type determining module 722. The segment determining module 720 is configured to determine one or more subtitle segments of the subtitle according to at least one of subtitle content of the subtitles, video frames, and audio content of the target video. The type determining module 722 is configured to determine a content type corresponding to one or more subtitle segments, respectively.

In another embodiment, as shown in FIG. 7, the type determining module 722 may include a determining sub-module 724. The determining sub-module 724 is configured to input a target subtitle segment into a classification model for processing to obtain a content type corresponding to the target subtitle segment, the target subtitle segment being any one of the one or more subtitle segments. The classification model is trained according to reference subtitle segments and calibration content types of the reference subtitle segments.

In yet another embodiment, as shown in FIG. 7, the apparatus may further include an information determining module 732, a subtitle expanding module 734, and a subtitle determining module 736. The information determining module 732 is configured to determine key information from initial subtitles of the target video. The subtitle expanding module 734 is configured to determine expanded subtitles according to the key information. The subtitle determining module 736 is configured to determine the subtitle of the target video according to the initial subtitles and the expanded subtitles.

In yet another embodiment, as shown in FIG. 7, the display mode of the subtitle may include a plurality of display modes corresponding to the content type of the subtitle, and the play control module 606 may include a mode transmitting sub-module 726, a mode receiving sub-module 728, and a play control sub-module 730. The mode transmitting sub-module 726 is configured to provide the terminal with the plurality of display modes to be selected for the content type. The mode receiving sub-module 728 is configured to receive a selected display mode from the terminal. The play control sub-module 730 is configured to control the terminal to display the subtitle corresponding to the content type on the video picture of the target video according to the selected display mode during the playback of the target video.

In embodiments, the content type may include one or any combinations of dialogue, narration, poetry, lyrics, and annotation.

In embodiments, the display mode may include at least one of display time, display position, display font, display color, display size, layout manner, display background, and the transparency of the display background of the target video on the video picture.

It should be understood for those of ordinary skilled in the art that the video subtitle display apparatuses described above are merely for illustration purpose and the present disclosure is not intended to be limiting. The settings of each module and/or sub-module may be adjusted flexibly according to personal preference and/or actual implementation scenario to meet the technical solutions of the present disclosure.

The video subtitle display apparatuses according to the embodiments of the present disclosure includes a request receiving module configured to receive a request to play a target video sent by a terminal; a mode determining mode configured to determine a display mode of a subtitle according to a content type corresponding to the subtitle of the target video; and a play control module configured to control the terminal to display the subtitle on a video picture according to the display mode when the target video is played. The video subtitle display apparatus provided by the embodiments of the present disclosure enables the display mode of the subtitle of the video to be changed according to the content type corresponding to the subtitle, and therefore, satisfy the user's viewing requirements for subtitles of different content types.

Figure 8:
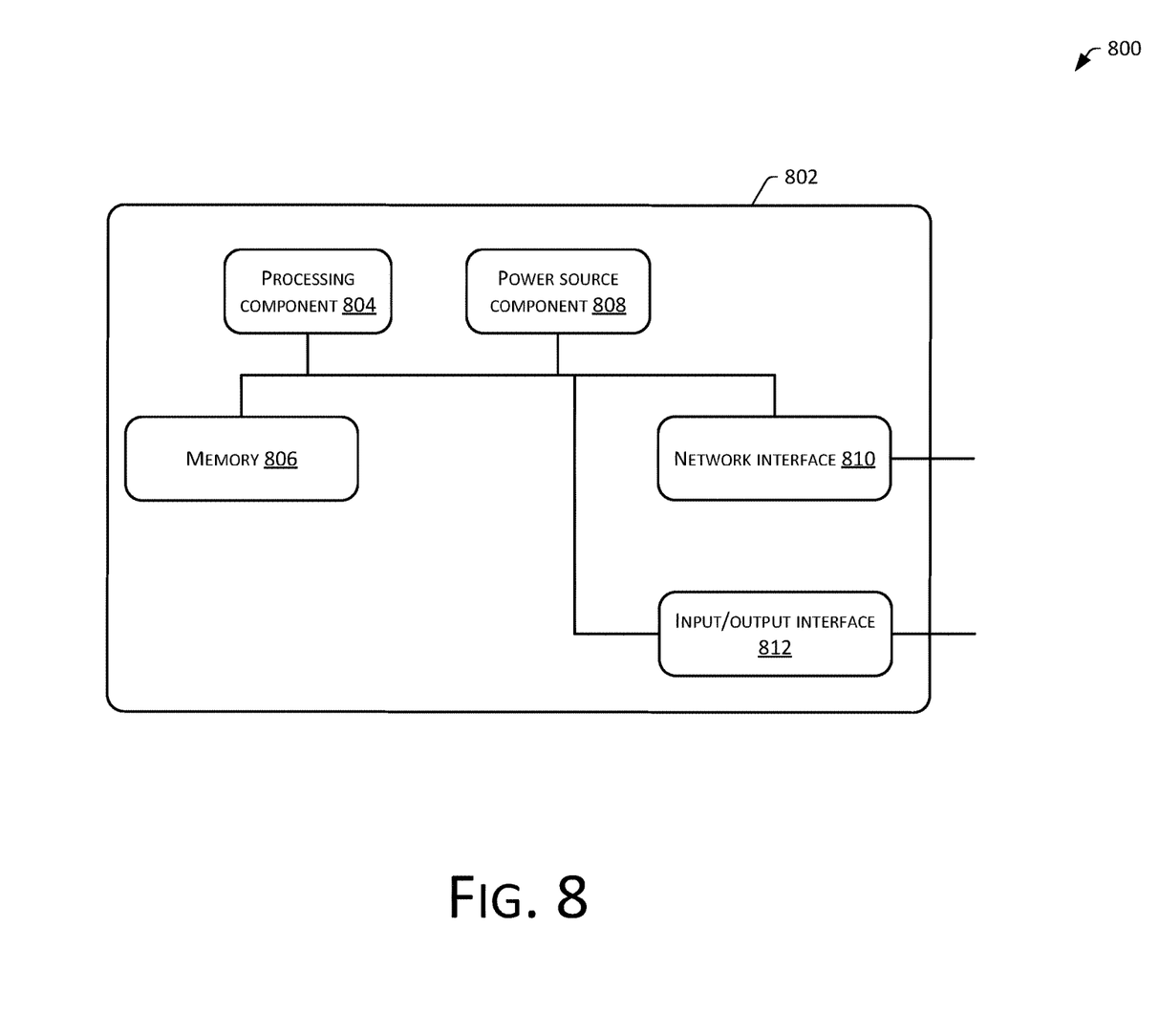
FIG. 8 illustrates a schematic diagram of a video subtitle display apparatus in accordance with an embodiment of the present disclosure.

FIG. 8 illustrates a schematic diagram of a video subtitle display apparatus in accordance with an embodiment of the present disclosure. For example, an apparatus 802 may be implemented as a server. Referring to FIG. 8, the apparatus 802 includes a processing component 804 that may further include one or more processors, and memory resources represented by the memory 806 configured to store instructions executable by the processing component 804, such as an application. The application stored in the memory 806 may include one or more modules, each corresponding to a set of instructions. Further, the processing component 804 may be configured to execute instructions to perform the methods described above.

The apparatus 802 may further include a power source component 808 configured to perform power management of the apparatus 802, a network interface 810 configured to connect the apparatus 802 to the network, and an input/output (I/O) interface 812. The apparatus 802 may operate according to an operating system stored in the memory 806, such as Windows Server™, Mac OS X™, Unix™, Linux™, FreeBSD™, or the like.

According to an illustrated implementation, a non-transitory computer readable storage medium may be provided, for example, the memory 806 storing computer program instructions executable by the processing component 804 of the apparatus 802 to perform the above methods.

The present disclosure may include a system, a method, and/or a computer program product. The computer program product may comprise a computer readable storage medium having computer readable program instructions embedded thereon for causing a processor to implement various aspects of the present disclosure.

The computer readable storage medium may be a tangible device that is configured to maintain and store the instructions used by the instruction execution device. The computer readable storage medium may be, for example, but not limited to, an electrical storage device, a magnetic storage device, an optical storage device, an electromagnetic storage device, a semiconductor storage device, or any suitable combination of the foregoing. More specific examples (non-exhaustive lists) of computer readable storage media may include: portable computer disks, hard disks, random access memory (RAM), read only memory (ROM), erasable programmable read only memory (EPROM or flash memory), static random access memory (SRAM), portable compact disk read only memory (CD-ROM), digital versatile disk (DVD), memory stick, floppy disk, mechanical encoding device, for example, a punched card or a protruding structure within a groove with instructions stored thereon, and any suitable combinations of the above. A computer readable storage medium as used herein is not to be interpreted as a transient signal itself, such as a radio wave or other free propagating electromagnetic wave, an electromagnetic wave propagating through a waveguide or other transmission medium (e.g., a light pulse through a fiber optic cable), or an electrical signal transmitted through a wire.

The computer readable program instructions described herein may be downloaded from a computer readable storage medium to various computing/processing devices or downloaded to an external computer or an external storage device over a network, such as the Internet, a local area network, a wide area network, and/or a wireless network. The network may include copper transmission cables, fiber optic transmissions, wireless transmissions, routers, firewalls, switches, gateway computers, and/or edge servers. A network adapter card or network interface in each computing/processing device may receive computer readable program instructions from the network and forward the computer readable program instructions to be stored in a computer readable storage medium in each computing/processing device.

Computer program instructions for performing the operations of the present disclosure may be assembly instructions, instruction set architecture (ISA) instructions, machine instructions, machine related instructions, microcode, firmware instructions, state setting data, or source codes or object codes written in any combinations of one or more programming languages. The programming language may include object-oriented programming languages such as Smalltalk, C++, etc., and conventional procedural programming languages such as "C" language or similar programming languages. The computer readable program instructions may be executed entirely on the user's computer, partially on the user's computer, as a stand-alone software package, partially on the user's computer and partially on the remote computer, or entirely on the remote computer or server. If executed in a remote computer, the remote computer may be connected to the user's computer through any type of network, including a local area network (LAN) or a wide area network (WAN), or may be connected to an external computer (e.g., using an Internet service provider to access the Internet connection). In some embodiments, the electronic circuit, such as a programmable logic circuit, a field programmable gate array (FPGA), or a programmable logic array (PLA), may be customized by utilizing state information of computer readable program instructions, which are executed to implement various aspects of the present disclosure.

Aspects of the present disclosure are described herein with reference to flowchart illustrations and/or schematic diagrams of methods, devices, and computer program products according to embodiments of the present disclosure. It should be understood for those of ordinary skilled in the art that the flowcharts and/or the schematic diagrams, and the combinations of one or more blocks of the flowcharts and/or the schematic diagrams, may be implemented by computer readable program instructions.

The computer readable program instructions may be provided to a general purpose computer, a special purpose computer, or a processor of other programmable data processing apparatus, and when executed by a processor of a computer or other programmable data processing apparatus, the computer readable program instructions may generate means that implements the functions/acts specified in one or more blocks of the flowcharts and/or the schematic diagrams.

The computer readable program instructions may also be stored in a computer readable storage medium that causes the computer, programmable data processing device, and/or other device to operate in a specific manner. The computer readable medium storing the instructions may include an article of manufacture, which comprises various aspects of the instructions to implement the functions/acts specified in one or more blocks of the flowcharts and/or the schematic diagrams.

Computer readable program instructions may also be loaded onto a computer, other programmable data processing device, or other device to perform a series of operational steps to produce a computer-implemented process. Thus, computer readable program instructions executed on a computer, other programmable data processing apparatus, or other device may implement the functions/acts specified in one or more blocks of the flowcharts and/or the schematic diagrams.

The flowcharts and schematic diagrams in the figures illustrate the architecture, functionality and operation of various implementations of systems, methods and computer program products according to various embodiments of the present disclosure. In this regard, each block in the flowchart or the schematic diagram may represent a module, a program segment, or a portion of an instruction, which include one or more executable instructions to implement the specified logic functions. In some alternative implementations, the functions specified in the blocks of a flowchart or a schematic diagram may be performed in a different order than those illustrated in the drawings. For example, two consecutive blocks of a flowchart or a schematic diagram may be executed substantially in parallel or in a reverse order, depending on the functionality being involved. It is also noted that each block and the combinations of the blocks of the flowcharts and/or the schematic diagrams may be implemented by hardware-based systems dedicated to performing specified functions or acts, or a combination of the hardware-based systems and the computer instructions.

The embodiments of the present disclosure described above are merely for illustration purpose and are non-exhaustive and not intended to be limiting. Numerous modifications and variations may be apparent to those of ordinary skilled in the art without departing from the scope of the invention. The choice of terms used herein is intended to best explain the principles, practical applications, or technical improvements of the techniques in the market, or to facilitate those of ordinary skill in the art to understand the embodiments disclosed herein.

The present disclosure can further be understood using the following clauses.

Clause 1: A video subtitle display method implemented on a server, the method comprising: receiving a play request for a target video sent by a terminal; determining a display mode of a subtitle of the target video according to a content type corresponding to the subtitle of the target video; and controlling the terminal to display the subtitle on a video picture of the target video according to the display mode when the target video is played.

Clause 2: The method of Clause 1, further comprising: determining one or more subtitle segments of the subtitle according to at least one of subtitle content, video frame, or audio content of the target video; and determining content types corresponding to the one or more subtitle segments of the subtitle, respectively.

Clause 3: The method of Clause 2, wherein determining content types corresponding to the one or more subtitle segments of the subtitle, respectively, further comprises: inputting a target subtitle segment into a classification model for processing, and obtaining a content type corresponding to the target subtitle segment, the target subtitle segment being one of the one or more subtitle segments, wherein the classification model is trained according to reference subtitle segments and calibration content types of the reference subtitle segments.

Clause 4: The method of Clause 1, further comprising: determining key information from an initial subtitle of the target video; determining an expanded subtitle of the key information; and determining the subtitle of the target video according to the initial subtitle and the expanded subtitle.

Clause 5: The method of Clause 1, wherein a content type of the subtitle of the target video corresponds to a plurality of display modes, wherein controlling, during the playing of the target video, the terminal to display the subtitle in a video picture of the target video according to the display mode further comprises: providing, to the terminal, the plurality of display modes to be selected with respect to the content type; receiving, from the terminal, a selected display mode; and controlling the terminal to display the subtitle on a video picture of the target video according to the selected display mode when the target video is played.

Clause 6: The method of Clause 1, wherein the content type of the subtitle includes at least one of dialogue, narration, poetry, lyrics, or annotation.

Clause 7: The method of any one of Clauses 1-4, wherein the display mode includes at least one of display time, display position, display font, display color, display size, layout manner, display background, or transparency of the display background of the subtitle of the target video on the video picture.

Clause 8: A video subtitle display apparatus implemented on a server, the apparatus comprising: a request receiving module configured to receive a play request for a target video sent by a terminal; a mode determining module configured to determine a display mode of a subtitle of the target video according to a content type corresponding to the subtitle of the target video; and a display control module configured to control the terminal to display the subtitle on a video picture of the target video according to the display mode when the target video is played.

Clause 9: The apparatus of Clause 8, further comprising: a segment determining module configured to determine one or more subtitle segments of the subtitle according to at least one of subtitle content, video frame, or audio content of the target video; and a type determining module configured to determine content types corresponding to the one or more subtitle segments of the subtitle, respectively.

Clause 10: The apparatus of Clause 9, wherein the type determining module further comprises: a determining sub-module configured to input a target subtitle segment into a classification model for processing, and obtain a content type corresponding to the target subtitle segment, the target subtitle segment being one of the one or more subtitle segments, wherein the classification model is trained according to reference subtitle segments and calibration content types of the reference subtitle segments.

Clause 11: The apparatus of Clause 8, further comprising: an information determining module configured to determine key information from an initial subtitle of the target video; a subtitle expanding module configured to determine an expanded subtitle of the key information; and a subtitle determining module configured to determine the subtitle of the target video according to the initial subtitle and the expanded subtitle.

Clause 12: The apparatus of Clause 8, wherein a content type of the subtitle of the target video corresponds to a plurality of display modes, wherein to control, during the playing of the target video, the terminal to display the subtitle in a video picture of the target video according to the display mode, the control display module further performs acts comprising: providing, to the terminal, the plurality of display modes to be selected with respect to the content type; receiving, from the terminal, a selected display mode; and controlling the terminal to display the subtitle on a video picture of the target video according to the selected display mode when the target video is played.

Clause 13: The apparatus of Clause 8, wherein the content type of the subtitle includes at least one of dialogue, narration, poetry, lyrics, or annotation.

Clause 14: The apparatus of Clause 8, wherein the display mode includes at least one of display time, display position, display font, display color, display size, layout manner, display background, or transparency of the display background of the subtitle of the target video on the video picture.

Clause 15: A video subtitle display apparatus comprising: a processor; and memory for storing processor executable instructions, wherein the processor is configured to perform the method of any one of Clauses 1-7, when executing the processor executable instructions.

Clause 16: A non-transitory computer readable storage medium having stored thereon computer program instructions, wherein the computer program instructions, when executed by a processor, implement the method of any one of Clauses 1-7.

What is claimed is:

1. A method comprising:
   receiving a play request for a target video sent by a terminal;
   determining a display mode of a subtitle of the target video set according to a content type corresponding to the subtitle of the target video;
   determining key information from an initial subtitle of the target video;
   determining an expanded subtitle of the key information;
   determining the subtitle of the target video according to the initial subtitle and the expanded subtitle; and
   controlling the terminal to display the subtitle on a video picture of the target video according to the display mode when the target video is played.

2. The method of claim 1, further comprising:
   determining one or more subtitle segments of the subtitle according to at least one of subtitle content, video frame, or audio content of the target video; and
   determining content types corresponding to the one or more subtitle segments of the subtitle, respectively.

3. The method of claim 2, wherein determining content types corresponding to the one or more subtitle segments of the subtitle, respectively, further comprises:
   inputting a target subtitle segment into a classification model for processing, and obtaining a content type corresponding to the target subtitle segment, the target subtitle segment being one of the one or more subtitle segments,
   wherein the classification model is trained according to reference subtitle segments and calibration content types of the reference subtitle segments.

4. The method of claim 1, wherein the display mode of the subtitle comprises a plurality of display modes corresponding to the content type of the subtitle of the target video,
wherein controlling the terminal to display the subtitle in a video picture of the target video according to the display mode when the target video is played further comprises:
providing, to the terminal, the plurality of display modes to be selected with respect to the content type;
receiving, from the terminal, a selected display mode; and
controlling the terminal to display the subtitle on a video picture of the target video according to the selected display mode when the target video is played.

5. The method of claim 1, wherein the content type of the subtitle includes at least one of dialogue, narration, poetry, lyrics, or annotation.

6. The method of claim 1, wherein the display mode includes at least one of display time, display position, display font, display color, display size, layout manner, display background, or transparency of the display background of the subtitle of the target video on the video picture.

7. An apparatus comprising:
one or more processors;
memory;
a request receiving module stored in the memory and executable by the one or more processors to receive a play request for a target video sent by a terminal;
a mode determining module stored in the memory and executable by the one or more processors to determine a display mode of a subtitle of the target video set according to a content type corresponding to the subtitle of the target video;
an information determining module stored in the memory and executable by the one or more processors to determine key information from an initial subtitle of the target video;
a subtitle expanding module stored in the memory and executable by the one or more processors to determine an expanded subtitle of the key information;
a subtitle determining module stored in the memory and executable by the one or more processors to determine the subtitle of the target video according to the initial subtitle and the expanded subtitle; and
a display control module stored in the memory and executable by the one or more processors to control the terminal to display the subtitle on a video picture of the target video according to the display mode when the target video is played.

8. The apparatus of claim 7, further comprising:
a segment determining module stored in the memory and executable by the one or more processors to determine one or more subtitle segments of the subtitle according to at least one of subtitle content, video frame, or audio content of the target video; and
a type determining module stored in the memory and executable by the one or more processors to determine content types corresponding to the one or more subtitle segments of the subtitle, respectively.

9. The apparatus of claim 8, wherein the type determining module further comprises:
a determining sub-module stored in the memory and executable by the one or more processors to input a target subtitle segment into a classification model for processing, and obtain a content type corresponding to the target subtitle segment, the target subtitle segment being one of the one or more subtitle segments,
wherein the classification model is trained according to reference subtitle segments and calibration content types of the reference subtitle segments.

10. The apparatus of claim 7, wherein the display mode of the subtitle comprises a plurality of display modes corresponding to the content type of the subtitle of the target video,
wherein to control the terminal to display the subtitle in a video picture of the target video according to the display mode when the target video is played, the control display module further performs acts comprising:
providing, to the terminal, the plurality of display modes to be selected with respect to the content type;
receiving, from the terminal, a selected display mode; and
controlling the terminal to display the subtitle on a video picture of the target video according to the selected display mode when the target video is played.

11. The apparatus of claim 7, wherein the content type of the subtitle includes at least one of dialogue, narration, poetry, lyrics, or annotation.

12. The apparatus of claim 7, wherein the display mode includes at least one of display time, display position, display font, display color, display size, layout manner, display background, or transparency of the display background of the subtitle of the target video on the video picture.

13. One or more non-transitory computer readable storage media storing executable instructions that, when executed by one or more processors, cause the one or more processors to perform acts comprising:
receiving a play request for a target video sent by a terminal;
determining a display mode of a subtitle of the target video set according to a content type corresponding to the subtitle of the target video;
determining key information from an initial subtitle of the target video;
determining an expanded subtitle of the key information;
determining the subtitle of the target video according to the initial subtitle and the expanded subtitle; and
controlling the terminal to display the subtitle on a video picture of the target video according to the display mode when the target video is played.

14. The one or more non-transitory computer readable storage media of claim 13, wherein the executable instructions, when executed by the one or more processors, cause the one or more processors to perform further acts comprising:
determining one or more subtitle segments of the subtitle according to at least one of subtitle content, video frame, or audio content of the target video; and
determining content types corresponding to the one or more subtitle segments of the subtitle, respectively.

15. The one or more non-transitory computer readable storage media of claim 14, wherein determining content types corresponding to the one or more subtitle segments of the subtitle, respectively, further comprises:
inputting a target subtitle segment into a classification model for processing, and obtaining a content type corresponding to the target subtitle segment, the target subtitle segment being one of the one or more subtitle segments, wherein the classification model is trained according to reference subtitle segments and calibration content types of the reference subtitle segments.

16. The one or more non-transitory computer readable storage media of claim 13, wherein the display mode of the subtitle comprises a plurality of display modes corresponding to the content type of the subtitle of the target video,
wherein controlling the terminal to display the subtitle in a video picture of the target video according to the display mode when the target video is played further comprises:
providing, to the terminal, the plurality of display modes to be selected with respect to the content type;
receiving, from the terminal, a selected display mode; and
controlling the terminal to display the subtitle on a video picture of the target video according to the selected display mode when the target video is played.

17. The one or more non-transitory computer readable storage media of claim 13, wherein the display mode includes at least one of display time, display position, display font, display color, display size, layout manner, display background, or transparency of the display background of the subtitle of the target video on the video picture.

* * * * *